(12) United States Patent
Hamatani

(10) Patent No.: US 10,167,375 B2
(45) Date of Patent: Jan. 1, 2019

(54) RUBBER COMPOSITION, CROSSLINKED RUBBER COMPOSITION, AND TIRE

(71) Applicant: BRIDGESTONE CORPORATION, Tokyo (JP)

(72) Inventor: Satoshi Hamatani, Higashimurayama (JP)

(73) Assignee: BRIDGESTONE CORPORATION, Chou-ku, Tokyo (JP)

( * ) Notice: Subject to any disclaimer, the term of this patent is extended or adjusted under 35 U.S.C. 154(b) by 0 days.

(21) Appl. No.: 15/501,284

(22) PCT Filed: Aug. 7, 2015

(86) PCT No.: PCT/JP2015/003989
§ 371 (c)(1),
(2) Date: Feb. 2, 2017

(87) PCT Pub. No.: WO2016/024397
PCT Pub. Date: Feb. 18, 2016

(65) Prior Publication Data
US 2017/0218165 A1 Aug. 3, 2017

(30) Foreign Application Priority Data

Aug. 11, 2014 (JP) .................. 2014-163750

(51) Int. Cl.
| | |
|---|---|
| *C08L 7/00* | (2006.01) |
| *C08K 3/04* | (2006.01) |
| *B60C 1/00* | (2006.01) |
| *C08L 21/00* | (2006.01) |
| *C09C 1/48* | (2006.01) |
| *C01B 32/00* | (2017.01) |

(52) U.S. Cl.
CPC .............. *C08K 3/04* (2013.01); *B60C 1/00* (2013.01); *C01B 32/00* (2017.08); *C08L 7/00* (2013.01); *C08L 21/00* (2013.01); *C09C 1/48* (2013.01); *C01P 2006/12* (2013.01); *C01P 2006/19* (2013.01); *C01P 2006/80* (2013.01); *C08K 2201/003* (2013.01); *C08K 2201/006* (2013.01); *C08K 2201/011* (2013.01)

(58) Field of Classification Search
CPC ......... C09C 1/48; B60C 1/00; C01P 2006/12; C01P 2006/19; C08L 7/00
See application file for complete search history.

(56) References Cited

U.S. PATENT DOCUMENTS

| | | | | |
|---|---|---|---|---|
| 6,099,818 | A | * 8/2000 | Freund ................ | B60C 1/00 152/450 |
| 2014/0005319 | A1 | * 1/2014 | Ichikawa .............. | C08L 7/00 524/420 |
| 2014/0011940 | A1 | 1/2014 | Fujisawa | |
| 2014/0024762 | A1 | 1/2014 | Kanou et al. | |

FOREIGN PATENT DOCUMENTS

| | | |
|---|---|---|
| CN | 103347948 A | 10/2013 |
| CN | 103443192 A | 12/2013 |
| EP | 0 872 514 A1 | 10/1998 |
| EP | 1 728 820 A1 | 12/2006 |
| EP | 2 738 225 A1 | 6/2014 |
| JP | 1-144434 A | 6/1989 |
| JP | 11-199709 A | 7/1999 |
| JP | 2001-253974 * | 9/2001 |
| JP | 2002-146234 A | 5/2002 |
| JP | 2005-220150 A | 8/2005 |
| JP | 2005-272734 A | 10/2005 |
| JP | 2012-87173 A | 5/2012 |
| JP | 2013-23537 A | 2/2013 |
| JP | 2013-82776 A | 5/2013 |
| WO | 2013/015368 A1 | 1/2013 |

OTHER PUBLICATIONS

International Search Report of PCT/JP2015/003989, dated Nov. 10, 2015. [PCT/ISA/210].
Communication dated Jan. 10, 2018 from the State Intellectual Property Office of the P.R.C. in counterpart Chinese application No. 201580042940.X.

* cited by examiner

Primary Examiner — Gregory Listvoyb
(74) Attorney, Agent, or Firm — Sughrue Mion, PLLC

(57) ABSTRACT

Provided is a rubber composition that, when adopted in a tire member such as a tread, displays low heat generation, high abrasion resistance, and high cut resistance, and enables excellent fatigue cracking resistance to be realized. The rubber composition contains carbon black that satisfies relationship formulae (1) to (3), shown below.

$$62.5 \times 24M4DBP + \text{hydrogen amount of carbon black} \leq 8337.5 \quad (1)$$

$$24M4DBP - 0.25 \times CTAB \geq 62.5 \quad (2)$$

$$Dst + 0.75 \times \Delta D50 \geq 152.5 \quad (3).$$

7 Claims, 2 Drawing Sheets

RUBBER COMPOSITION, CROSSLINKED RUBBER COMPOSITION, AND TIRE

CROSS REFERENCE TO RELATED APPLICATIONS

This application is a National Stage of International Application No. PCT/JP2015/003989 filed Aug. 7, 2015, claiming priority based on Japanese Patent Application No. 2014-163750, filed Aug. 11, 2014, the contents of all of which are incorporated herein by reference in their entirety.

TECHNICAL FIELD

The present disclosure relates to a rubber composition, a crosslinked rubber composition, and a tire.

BACKGROUND

Pneumatic tires are generally required to exhibit high performance in a manner that simultaneously meets multiple performance requirements. For example, in the case of a tire member such as a tread, in addition to requirements for abrasion resistance, cut resistance, low heat generation, and so forth, there is also demand for improvement of fatigue cracking resistance.

In one example of a conventional technique for improving fatigue cracking resistance, carbon black in which the degree of connection between particles of the carbon black is small (low structure carbon black) is compounded into a rubber composition.

However, a rubber composition containing low structure carbon black tends to suffer from poorer low heat generation and reduced cut resistance.

Examples of techniques for improving fatigue cracking resistance without using low structure carbon black include methods in which other physical properties of carbon black are adjusted. For example, PTL 1 discloses a rubber composition in which high structure carbon black having a CTAB value, a DBP value, and/or a 24M4DBP value in prescribed ranges is compounded with a rubber component that includes natural rubber and polybutadiene rubber blended in a specific ratio.

CITATION LIST

Patent Literature

PTL 1: JP H11-199709 A

SUMMARY

Technical Problem

However, although it is possible to achieve abrasion resistance and low heat generation to a certain extent through the technique in PTL 1, compounding of high structure carbon black leads to an insufficient effect in terms of fatigue cracking resistance, and thus there is demand for further improvement of fatigue cracking resistance.

Accordingly, an objective of the present disclosure is to provide a rubber composition and a crosslinked rubber composition obtained through crosslinking thereof that, when used in a tire member such as a tread, display low heat generation, high abrasion resistance, and high cut resistance, and enable excellent fatigue cracking resistance to be realized. Another objective of the present disclosure is to provide a tire for which high levels of abrasion resistance, cut resistance, fatigue cracking resistance, and low heat generation are realized.

Solution to Problem

The inventor conducted diligent investigation in order to solve the problems described above and, as a result, discovered that, with respect to carbon black compounded into a rubber composition, reducing the amount of hydrogen in the carbon black enables improvement of fatigue cracking resistance even when high structure carbon black is used, and keeping a structure and compressed-sample DBP absorption number of the carbon black within specific ranges while setting a broad structure distribution for the carbon black enables improvement of cut resistance, abrasion resistance, and low heat generation. This discovery led to the present disclosure.

The present disclosure is based on the findings described above and the main points thereof are as follows.

A presently disclosed rubber composition comprises carbon black, wherein the carbon black satisfies relationship formulae (1) to (3), shown below, $$62.5 \times 24M4DBP + \text{hydrogen amount of carbon black} \leq 8337.5 \quad (1)$$

$$24M4DBP - 0.25 \times CTAB \leq 62.5 \quad (2)$$

$$Dst + 0.75 \times \Delta D50 \geq 152.5 \quad (3)$$

where 24M4DBP indicates a compressed-sample DBP absorption number ($cm^3/100$ g), CTAB indicates a CTAB adsorption specific surface area ($m^2/g$), Dst indicates a highest frequency value (nm) on a Stokes' diameter distribution curve, $\Delta D50$ indicates a full width at half maximum (nm) of the distribution curve with respect to Dst, and the hydrogen amount of carbon black is in units of mass ppm. When this rubber composition is used in a tire member such as a tread, the rubber composition displays low heat generation, high abrasion resistance, and high cut resistance, and enables excellent fatigue cracking resistance to be realized.

The carbon black preferably also satisfies relationship formula (4), shown below, $$0.885 \leq \Delta D50/Dst \leq 1.030 \quad (4).$$

As a result of the carbon black also satisfying relationship formula (4), cut resistance, abrasion resistance, and low heat generation can be further improved.

Moreover, CTAB is preferably from 70 ($m^2/g$) to 90 ($m^2/g$) and 24M4DBP is preferably from 85 ($cm^3/100$ g) to 100 ($cm^3/100$ g). As a result, cut resistance, abrasion resistance, and low heat generation can be further improved.

Furthermore, the hydrogen amount of carbon black is preferably from 2,000 (mass ppm) to 2,700 (mass ppm). As a result, fatigue cracking resistance can be further improved without lowering other aspects of performance.

A presently disclosed crosslinked rubber composition is obtained through crosslinking of the presently disclosed rubber composition. Accordingly, the presently disclosed crosslinked rubber composition displays low heat generation, high abrasion resistance, and high cut resistance, and also displays excellent fatigue cracking resistance.

In a presently disclosed tire, the presently disclosed rubber composition or the presently disclosed crosslinked rubber composition is used as a material. The resultant tire displays low heat generation, high abrasion resistance, and high cut resistance, and also displays excellent fatigue cracking resistance.

Advantageous Effect

According to the present disclosure, it is possible to provide a rubber composition and a crosslinked rubber composition that, when used in a tire member such as a tread, display low heat generation, high abrasion resistance, and high cut resistance, and enable excellent fatigue cracking resistance to be realized. Moreover, high levels of abrasion resistance, cut resistance, fatigue cracking resistance, and low heat generation can be realized through use of the aforementioned rubber composition or crosslinked rubber composition as a tire material.

DETAILED DESCRIPTION

Figure 1:
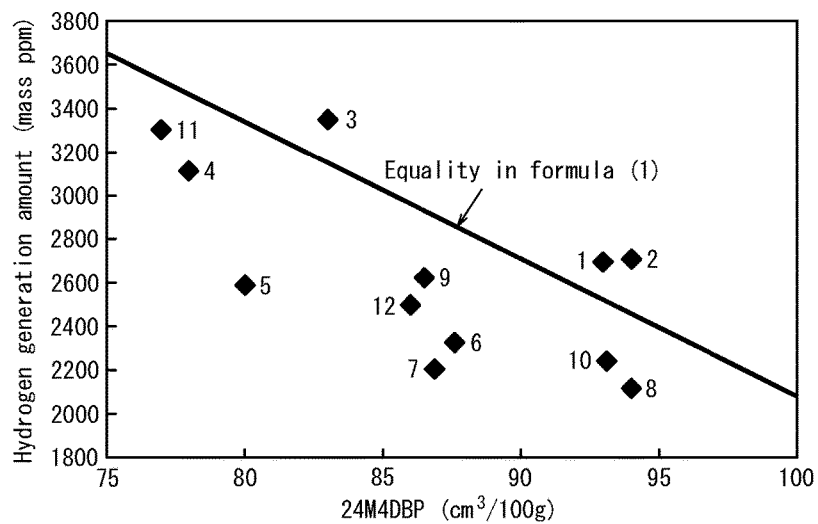
FIG. 1 illustrates a relationship between a compressed-sample DBP absorption number (24M4DBP) and a hydrogen amount of carbon black for each of carbon blacks 1-12 in examples.

The following provides a specific description of an embodiment of the present disclosure.
(Rubber Composition)
The presently disclosed rubber composition is a rubber composition that contains carbon black.
Rubber Component
No specific limitations are placed on a rubber component of the presently disclosed rubber composition. For example, natural rubber or a diene-based synthetic rubber may be used individually, or natural rubber and a diene-based synthetic rubber may be used in combination since these rubbers enable excellent abrasion resistance to be obtained. Examples of the aforementioned diene-based synthetic rubber include polyisoprene rubber (IR), styrene-butadiene copolymer rubber (SBR), and polybutadiene rubber (BR). One of such diene-based synthetic rubbers may be used individually, or two or more of such diene-based synthetic rubbers may be used as a blend.
Carbon black
A feature of the carbon black contained in the presently disclosed rubber composition is that the carbon black satisfies relationship formulae (1) to (3), shown below.

$$62.5 \times 24M4DBP + \text{hydrogen amount of carbon black} \leq 8337.5 \quad (1)$$

$$24M4DBP - 0.25 \times CTAB \geq 62.5 \quad (2)$$

$$Dst + 0.75 \times \Delta D50 \geq 152.5 \quad (3)$$

In these formulae, 24M4DBP indicates a compressed-sample DBP absorption number (cm$^3$/100 g), CTAB indicates a CTAB adsorption specific surface area (m$^2$/g), Dst indicates a highest frequency value (nm) on a Stokes' diameter distribution curve, ΔD50 indicates a full width at half maximum (nm) of the distribution curve with respect to Dst, and the hydrogen amount of carbon black is in units of mass ppm.

As a result of the carbon black satisfying relationship formula (1), the hydrogen amount of carbon black of the carbon black can be reduced and bonding between the surface of the carbon black and the rubber component can be inhibited. This improves elongation characteristics of the rubber composition and, consequently, can improve fatigue cracking resistance even when high structure carbon black is used. Moreover, abrasion resistance, cut resistance, and low heat generation can be improved as a result of high structure carbon black being used.

Note that the compressed-sample DBP absorption number (cm$^3$/100 g) is the amount of DBP (dibutyl phthalate) oil absorption by the carbon black after the carbon black has been compressed four times at a pressure of 24,000 psi and can be measured by a method in accordance with JIS K 6217-4. The hydrogen amount of carbon black (mass ppm) is the amount of hydrogen gas (mass ppm) that is generated under prescribed conditions which, in the case of the present disclosure, involve superheating for 15 minutes at 2000° C. in an argon atmosphere using a hydrogen analyzer.

As a result of the carbon black satisfying relationship formula (2), the carbon black can be provided with higher structure to an extent that does not cause deterioration of fatigue cracking resistance, which enables improvement of cut resistance and abrasion resistance.

The CTAB adsorption specific surface area (m$^2$/g) is the external surface area of the carbon black, exclusive of pores, as indicated by the specific surface area when CTAB (cetyltrimethylammonium bromide) is adsorbed by the carbon black, and can be measured in accordance with JIS K 6217-3.

As a result of the carbon black satisfying relationship formula (3), a structure distribution of the carbon black can be broadened (widened), which can raise homogeneity of the carbon black and improve low heat generation of the rubber composition.

The highest frequency value Dst (nm) on a Stokes' diameter distribution curve is the highest frequency value when a distribution of aggregates of the carbon black (i.e., primary aggregates of carbon black particles) is investigated, and thus, in other words, is a most commonly occurring aggregate diameter, expressed as a Stokes' diameter. The term "Stokes' diameter" refers to a particle diameter expressed by the diameter of a sphere of the same density that sediments at the same speed in a medium in a sedimentation method. The full width at half maximum (nm) of the distribution curve relative to Dst is the absolute value of the difference between two Stokes' diameters (i.e., a larger Stokes' diameter and a smaller Stokes' diameter) for which the frequency is 50% of that for Dst.

Dst of the carbon black is measured by a centrifugal sedimentation method in accordance with JIS K 6217-6. In the centrifugal sedimentation method, the dried carbon black is first precisely weighed and is mixed with a 20% ethanol aqueous solution containing a small amount of a surfactant in order to prepare a dispersion liquid having a carbon black concentration of 50 mg/L. The prepared dispersion liquid is used as a sample solution after being subjected to sufficient dispersing by ultrasound.

The device used in the centrifugal sedimentation method is, for example, a disc centrifuge produced by Joyce-Loebl that is set to a rotation speed of 6,000 rpm. The disc centrifuge is charged with 10 mL of a spin liquid (2% glycerin aqueous solution), and then 1 mL of a buffer liquid (ethanol aqueous solution) is poured therein. Next, 0.5 mL of the sample is added into the disc centrifuge using a syringe, centrifugal sedimentation is started at once, and a distribution curve of formed aggregates is plotted by a photoelectric sedimentation method. A Stokes' diameter corresponding to a peak of the plotted curve is taken to be Dst (nm). The width of the distribution curve at a position equivalent to 50% of the frequency (wt %) of the highest frequency value (i.e., the full width at half maximum) is taken to be ΔD50.

The carbon black preferably further satisfies relationship formula (4), shown below.

$$0.885 \leq \Delta D50/Dst \leq 1.030 \quad (4)$$

Abrasion resistance, cut resistance, and low heat generation can be further improved as a result of the carbon black satisfying relationship formula (4). In order to achieve these effects to an even greater extent, it is more preferable that ΔD50/Dst is within a range of 0.885≤ΔD50/Dst≤0.970. Moreover, in order to obtain an even better cut resistance and low heat generation, it is more preferable that Dst is no greater than 98 (nm).

No specific limitations are placed on methods that can be used to control the values of Dst and ΔD50. For example, the values of Dst and ΔD50 can be controlled through adjustment of the production conditions of the carbon black.

CTAB is preferably from 70 (m²/g) to 90 (m²/g), more preferably from 70 (m²/g) to 85 (m²/g), and particularly preferably from 74 (m²/g) to 85 (m²/g). Abrasion resistance can be improved through the value of CTAB being at least 70 (m²/g) and an effect of excellent heat generation can be obtained through the value of CTAB being no greater than 90 (m²/g).

24M4DBP is preferably from 85 (cm³/100 g) to 100 (cm³/100 g), more preferably from 88 (cm³/100 g) to 100 (cm³/100 g), and particularly preferably from 90 (cm³/100 g) to 100 (cm³/100 g). If 24M4DBP is less than 85 (cm³/100 g), abrasion resistance may be reduced due it not being possible to sufficiently achieve an effect of physical reinforcement through compounding of the carbon black into the rubber composition. On the other hand, if 24M4DBP is greater than 100 (cm³/100 g), kneading workability may be negatively affected due to an increase in viscosity of the rubber composition.

The hydrogen amount of carbon black is preferably from 2,000 (mass ppm) to 2,700 (mass ppm), more preferably from 2,000 (mass ppm) to 2,500 (mass ppm), and particularly preferably from 2,000 (mass ppm) to 2,400 (mass ppm). If the hydrogen amount of carbon black is less than 2,000 (mass ppm), abrasion resistance may be negatively affected. On the other hand, if the hydrogen amount of carbon black is greater than 2,700 (mass ppm), fatigue cracking resistance may be negatively affected due to the hydrogen amount of carbon black not being sufficiently reduced.

Although no specific limitations are placed on the amount of the carbon black that is contained in the presently disclosed rubber composition, from a viewpoint of realizing the high levels of abrasion resistance, cut resistance, fatigue cracking resistance, and low heat generation that are effects of the presently disclosed rubber composition, the amount of the carbon black relative to 100 parts by mass of the rubber component is preferably at least 30 parts by mass, more preferably from 30 parts by mass to 70 parts by mass, and particularly preferably from 40 parts by mass to 60 parts by mass.

The carbon black may be produced, for example, using a normal oil furnace as summarized below. Specifically, a feedstock of uniform composition is sprayed into a narrow region of the furnace using a nozzle that enables spraying of the feedstock into the reaction furnace as oil droplets with a small distribution. The temperature in the furnace is set as a uniform and high temperature that is suitable for production of fine particle diameter carbon black and a distribution of combustion gas flow is kept small such as to enable a short and uniform reaction time.

Examples of production conditions that may be controlled in order that the values of Dst and ΔD50 satisfy formula (3) include the reaction temperature and air ratio.

Moreover, examples of production conditions that may be controlled in order that the value of 24M4DBP satisfies formulae (1) and (2) include the amount of KOH.

Furthermore, examples of production conditions that may be controlled in order that the value of the hydrogen amount of carbon black satisfies formula (1) include the reaction time.

However, these production conditions are merely examples. The carbon black may be produced under other production conditions so long as the target values can be obtained and the target values may be realized through adjustment of factors other than the production conditions.

Other Components

The presently disclosed rubber composition may contain various other components besides the rubber component and the carbon black described above.

For example, the rubber composition may contain appropriately selected compounding agents that are normally used in the rubber industry to an extent that is not inconsistent with the objectives of the present disclosure. Examples of such compounding agents include fillers such as silica, crosslinking agents such as sulfur, crosslinking accelerators, process oils, anti-scorch agents, zinc oxide, and stearic acid. Commercially available products can be suitably used as these compounding agents.

The rubber composition can be produced through kneading, warming, extrusion, and the like of the rubber component with various compounding agents that are appropriately selected as necessary.

(Crosslinked Rubber Composition)

A presently disclosed crosslinked rubber composition is obtained through crosslinking of the presently disclosed rubber composition described above.

No specific limitations are placed on the crosslinking conditions and vulcanization may, for example, be carried out under commonly known vulcanization conditions. In terms of conditions of the vulcanization, the vulcanization is carried out, for example, at a temperature of 100° C. or higher, preferably from 125° C. to 200° C., and more preferably from 130° C. to 180° C.

(Tire)

In a presently disclosed tire, the previously described rubber composition or crosslinked rubber composition is used as a material. Specifically, the rubber composition or crosslinked rubber composition is adopted as a tire material for any tire member, among which, a tread is particularly preferable. In a tire including a tread in which the previously described rubber composition or crosslinked rubber composition is used, high levels of abrasion resistance, cut resistance, fatigue cracking resistance, and low heat generation can be realized. Examples of gases that can be used for inflating the presently disclosed tire include regular air, air with adjusted oxygen partial pressure, and inert gases such as nitrogen.

EXAMPLES

The following provides a more detailed description of the present disclosure through examples. However, the present disclosure is not in any way limited by the following examples.

(Carbon Black)

Carbon blacks 1-12 were prepared with the parameters shown in Table 1. Carbon blacks 1, 2, 6-10, and 12 were produced by using fine particle diameter, high structure HAF carbon black produced by Asahi Carbon Co., Ltd. and by adjusting the reaction temperature, air ratio, amount of KOH, and reaction time. For carbon blacks 3-5 and 11, the parameters were changed by adjusting production conditions with respect to fine particle diameter, low structure HAF carbon black produced by Asahi Carbon Co., Ltd.

CTAB and 24M4DBP in Table 1 were measured in accordance with JIS K 6217-3 and JIS K 6217-4, respectively. Furthermore, Dst and ΔD50 were measured by a centrifugal sedimentation method using a disc centrifuge produced by Joyce-Loebl. The hydrogen amount of carbon black was obtained by using a hydrogen analyzer to measure the amount of hydrogen gas that was generated when 10 mg of the carbon black was superheated for 15 minutes at 2000° C. in an argon atmosphere.

TABLE 1

| | CTAB ($m^2/g$) | 24M4DBP ($cm^3/$ 100 g) | Dst (nm) | ΔD50 (nm) | Hydrogen amount of carbon black (mass ppm) | Note |
|---|---|---|---|---|---|---|
| Carbon black 1 | 92 | 93 | 90 | 90 | 2698 | Comparative example |
| Carbon black 2 | 96 | 94 | 82 | 73 | 2710 | Comparative example |
| Carbon black 3 | 86 | 83 | 91 | 110 | 3355 | Comparative example |
| Carbon black 4 | 91 | 78 | 68 | 110 | 3112 | Comparative example |
| Carbon black 5 | 94 | 80 | 62 | 110 | 2596 | Comparative example |
| Carbon black 6 | 78 | 88 | 99 | 94 | 2333 | Example |
| Carbon black 7 | 80 | 87 | 96 | 90 | 2208 | Example |
| Carbon black 8 | 77 | 94 | 114 | 101 | 2125 | Example |
| Carbon black 9 | 83 | 87 | 92 | 94 | 2628 | Example |
| Carbon black 10 | 75 | 93 | 108 | 101 | 2249 | Example |
| Carbon black 11 | 87 | 77 | 60 | 103 | 3301 | Comparative example |
| Carbon black 12 | 82 | 86 | 81 | 84 | 2502 | Comparative example |

Figure 2:
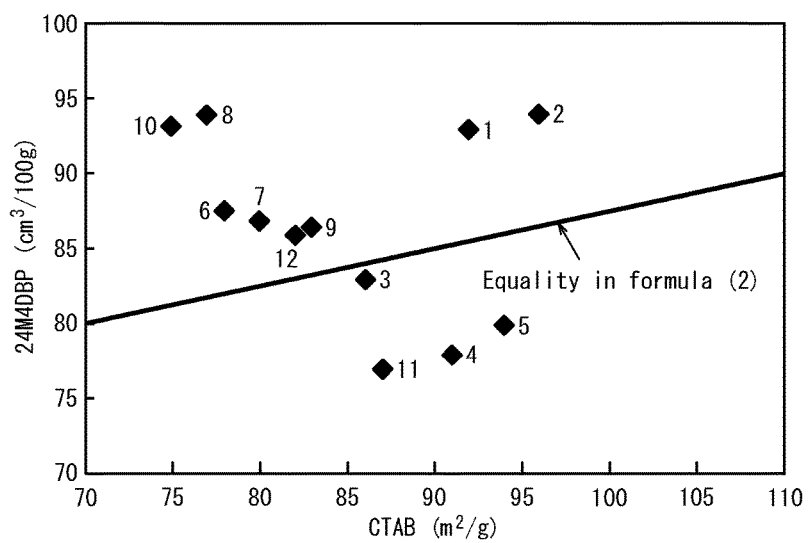
FIG. 2 illustrates a relationship between a CTAB adsorption specific surface area (CTAB) and the compressed-sample DBP absorption number (24M4DBP) for each of carbon blacks 1-12 in the examples.
Figure 3:
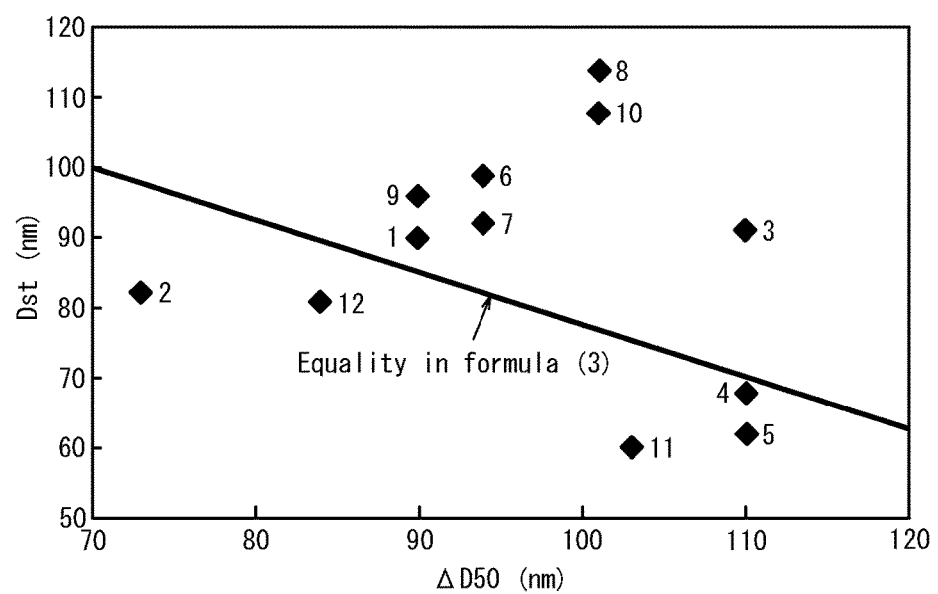
FIG. 3 illustrates a relationship between a highest frequency value (Dst) on a Stokes' diameter distribution curve and a full width at half maximum (ΔD50) of the Stokes' diameter distribution curve with respect to the highest frequency value (Dst) for each of carbon blacks 1-12 in the examples.

FIG. 1 illustrates a relationship between the compressed-sample DBP absorption number (24M4DBP) and the hydrogen amount of carbon black for each of carbon blacks 1-12. FIG. 2 illustrates a relationship between the CTAB adsorption specific surface area (CTAB) and the compressed-sample DBP absorption number (24M4DBP) for each of carbon blacks 1-12. FIG. 3 illustrates a relationship between the highest frequency value (Dst) on a Stokes' diameter distribution curve and the full width at half maximum (ΔD50) of the Stokes' diameter distribution curve with respect to the highest frequency value (Dst) for each of carbon blacks 1-12.

The line in FIG. 1 indicates equality in relationship formula (1): 62.5×24M4DBP +hydrogen amount of carbon black =8337.5. Accordingly, the aforementioned line indicates that points on or below the line are included within the scope of the present application (i.e., are examples of the present disclosure). The line in FIG. 2 indicates equality in relationship formula (2): 24M4DBP−0.25×CTAB=62.5. Accordingly, the aforementioned line indicates that points on or above the line are included within the scope of the present application (i.e., are examples of the present disclosure). The line in FIG. 3 indicates equality in relationship formula (3): Dst+0.75×ΔD50=152.5. Accordingly, the aforementioned line indicates that points on or above the line are included within the scope of the present application (i.e., are examples of the present disclosure).

<Rubber Composition Samples 1-12>

Rubber composition samples 1-12 were produced by standard compounding and kneading according to the formulation shown in Table 2. Note that carbon blacks 1-12 in Table 1 were compounded into samples 1-12, respectively.

TABLE 2

| Component | Amount (parts by mass) |
|---|---|
| Natural rubber | 100 |
| Carbon black *1 | 40 |
| Silica *2 | 10 |
| Stearic acid | 3 |
| Age resistor *3 | 2 |
| Zinc oxide | 4 |
| Vulcanization accelerator *4 | 1.5 |
| Sulfur | 1.5 |

*1 Carbon blacks 1-12 in Table 1
*2 Nipsil AQ produced by Nippon Silica Industrial Co., Ltd., BET specific surface area = 220 $m^2/g$
*3 NOCRAC 6C produced by Ouchi Shinko Chemical Industrial Co., Ltd.
*4 NOCCELER CZ produced by Ouchi Shinko Chemical Industrial Co., Ltd., N-cyclohexyl-2-benzothiazylsulfenamide <Evaluation>

The following evaluations (1) to (3) were performed for each of the produced rubber composition samples 1-12 after vulcanization thereof.

The results of evaluations (1) to (3) are shown in Table 3.

(1) Low Heat Generation and Cut Resistance

With respect to each of the vulcanized rubber composition samples, a viscoelasticity meter (produced by Rheometrics Inc.) was used to measure the loss tangent (tan δ) and the storage modulus (G') at a temperature of 60° C., a strain of 5%, and a frequency of 15 Hz.

In the evaluation, tan δ and G' for sample 4 obtained using carbon black 4 were each taken to be 100 and the results for samples 1-3 and 5-12 obtained using carbon blacks 1-3 and 5-12, respectively, were expressed as index values based on the following formulae.

Heat generation index value={(tan δ of vulcanized rubber composition sample)/(tan δ of vulcanized rubber composition sample 4)}×100

Elastic modulus index value={(G' of vulcanized rubber composition sample)/(G' of vulcanized rubber composition sample 4)}×100

A smaller heat generation index value indicates lower heat generation and lower hysteresis loss. A larger elastic modulus index value indicates better cut resistance.

(2) Fatigue Cracking Resistance

With respect to each of the vulcanized rubber composition samples, a tensile test device (produced by Instron) was used to measure the tear strength of a trouser test piece in accordance with JIS K 6252.

The results were expressed as index values based on the following formula by taking the tear strength for sample 4 to be 100.

Fatigue cracking resistance index value={(Tear strength of vulcanized rubber composition sample)/(Tear strength of vulcanized rubber composition sample 4)}×100

A larger fatigue cracking resistance index value indicates better cracking resistance.

(3) Abrasion Resistance

A test piece was prepared from each of the vulcanized rubber composition samples by cutting out a circular sheet shape (16.2 mm in diameter×6 mm in thickness) and was subjected to a DIN abrasion test at room temperature in accordance with JIS K 6264-2:2005. An abrasion amount ($mm^3$) in the DIN abrasion test was measured.

The reciprocal of each abrasion amount was expressed as an index value by taking the reciprocal of the abrasion amount of sample 4 to be 100. A larger index value indicates better abrasion resistance.

INDUSTRIAL APPLICABILITY

According to the present disclosure, it is possible to provide a rubber composition and a crosslinked rubber composition that, when used in a tire member such as a tread, display low heat generation, high abrasion resistance, and high cut resistance, and enable excellent fatigue cracking resistance to be realized. Moreover, high levels of abrasion resistance, cut resistance, fatigue cracking resistance, and low heat generation can be realized through use of the aforementioned rubber composition or crosslinked rubber composition as a tire material.

The invention claimed is:

1. A rubber composition comprising carbon black, wherein $$62.5 \times 24M4DBP + \text{hydrogen amount of carbon black} \leq 8337.5 \quad (1)$$

$$24M4DBP - 0.25 \times CTAB \geq 62.5 \quad (2)$$

$$Dst + 0.75 \times \Delta D50 \geq 152.5 \quad (3)$$

$$0.885 \leq \Delta D50/Dst \leq 1.030 \quad (4)$$

where 24M4DBP indicates a compressed-sample DBP absorption number ($cm^3/100$ g), CTAB indicates a CTAB adsorption specific surface area ($m^2/g$), Dst indicates a highest frequency value (nm) on a Stokes' diameter distribution curve, ΔD50 indicates a full width at half maximum (nm) of the distribution curve with respect to Dst, and the hydrogen amount of carbon black is in units of mass ppm.

2. The rubber composition of claim 1, wherein CTAB is from 70 ($m^2/g$) to 90 ($m^2/g$).

3. The rubber composition of claim 1, wherein 24M4DBP is from 85 ($cm^3/100$ g) to 100 ($cm^3/100$ g).

4. The rubber composition of claim 1, wherein the hydrogen amount of carbon black is from 2,000 (mass ppm) to 2,700 (mass ppm).

TABLE 3

| | Sample no. | | | | | | | | | | | |
|---|---|---|---|---|---|---|---|---|---|---|---|---|
| | 1 Comparative example | 2 Comparative example | 3 Comparative example | 4 Comparative example | 5 Comparative example | 6 Example | 7 Example | 8 Example | 9 Example | 10 Example | 11 Comparative example | 12 Comparative example |
| Cut resistance (elastic modulus index value) | 102 | 111 | 95 | 100 | 102 | 101 | 100 | 105 | 100 | 108 | 93 | 101 |
| Low heat generation (heat generation index value) | 106 | 109 | 94 | 100 | 104 | 93 | 97 | 97 | 100 | 97 | 103 | 107 |
| Fatigue cracking resistance | 74 | 73 | 97 | 100 | 114 | 114 | 134 | 118 | 141 | 115 | 106 | 110 |
| Abrasion resistance | 115 | 124 | 101 | 100 | 94 | 105 | 106 | 113 | 112 | 113 | 102 | 104 |

As can be seen from the results in Table 3, the samples of the examples demonstrated excellent results in each evaluation category compared to the samples of the comparative examples. Among these samples, even better cut resistance and low heat generation was obtained for samples 6, 8, and 10.

5. A crosslinked rubber composition obtained through crosslinking of the rubber composition of claim 1.

6. A tire in which the rubber composition of claim 1 is used as a material.

7. A tire in which the crosslinked rubber composition of claim 5 is used as a material.

* * * * *